(12) United States Patent
Rieger et al.

(10) Patent No.: US 7,878,885 B2
(45) Date of Patent: Feb. 1, 2011

(54) DEFLECTION DEVICE FOR A ROPE SAW ASSEMBLY

(75) Inventors: Hans-Joerg Rieger, Thueringen (AT); Josef Plattner, Maurach (AT)

(73) Assignee: Hilti Aktiengesellschaft, Schaan (LI)

( * ) Notice: Subject to any disclaimer, the term of this patent is extended or adjusted under 35 U.S.C. 154(b) by 311 days.

(21) Appl. No.: 12/157,741

(22) Filed: Jun. 11, 2008

(65) Prior Publication Data

US 2008/0314218 A1    Dec. 25, 2008

(30) Foreign Application Priority Data

Jun. 14, 2007    (DE) .................... 10 2007 000 329

(51) Int. Cl.
*B24B 23/06* (2006.01)
*B28D 1/08* (2006.01)

(52) U.S. Cl. .................... 451/296; 451/452; 125/21

(58) Field of Classification Search ............. 125/21, 125/16.02; 451/296, 452, 454
See application file for complete search history.

(56) References Cited

U.S. PATENT DOCUMENTS

| 4,750,468 A | 6/1988 | Micheletti |
| 6,772,750 B2 * | 8/2004 | Plattner et al. ............ 125/21 |

* cited by examiner

*Primary Examiner*—Robert Rose
(74) *Attorney, Agent, or Firm*—Abelman, Frayne & Schwab

(57) ABSTRACT

A deflection device for a rope saw assembly, includes a deflection roller (12; 52; 92); a stationary protective cover (13; 53, 93) surrounding art least some regions of the deflection roller (12; 52; 92); and at least one cover member (23; 63; 102, 103) pivotally arranged on the protective cover (13; 53, 93) surrounding at least some regions of the deflection roller, and displaceable along a path radially spaced from the axle (15; 55; 95) of the deflection roller (12; 52; 92).

7 Claims, 3 Drawing Sheets

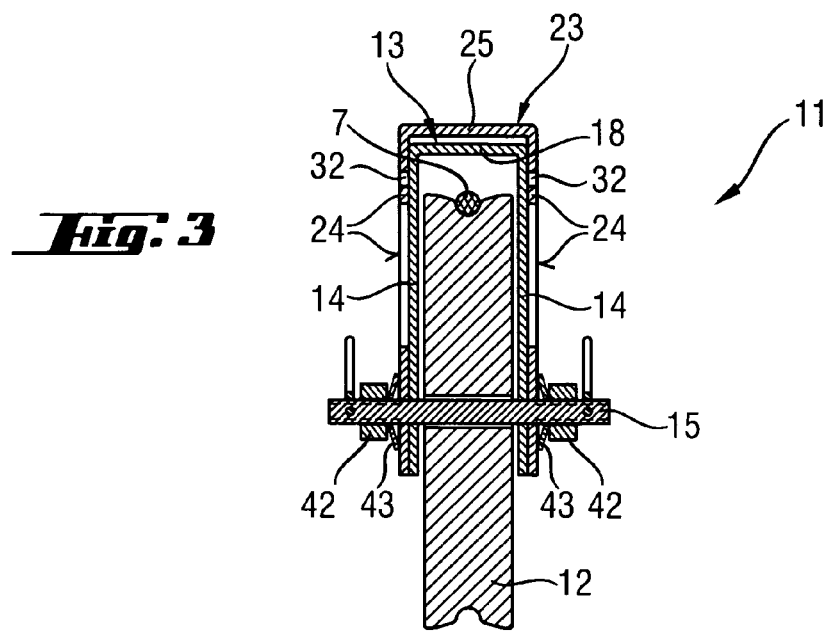
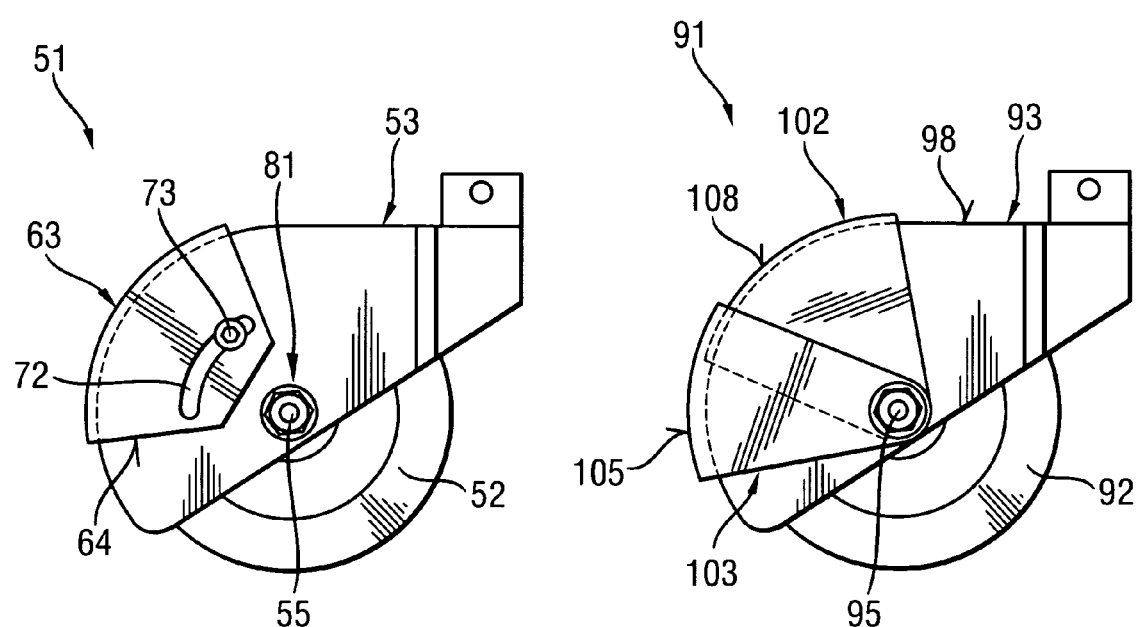

DEFLECTION DEVICE FOR A ROPE SAW ASSEMBLY

BACKGROUND OF THE INVENTION

1. Field of the Invention

The present invention relates to a deflection device for a rope saw assembly and including a deflection roller and a stationary protective cover and a cover member both surrounding at least some regions of the deflection roller, with the cover member displaceable along a path radially spaced from the roller-supporting axle.

2. Description of the Prior Art

Rope saws are used in particular for sawing large workpieces such as, e.g., stone blocks. A saw rope carries cutting bodies in form, e.g., of sintered diamond pearls and is driven by a motorized drive of the open saw. Deflection rollers guide the saw rope about a to-be cut workpiece, with the deflection rollers being arranged in accordance with a profile of a to-be-produced cut. A load applied to the saw rope could cause a rope break, and the broken saw rope would shoot up through the air like a whip.

European Patent EP 1 528 852 B1 discloses a deflection device for a saw assembly and which includes a deflection roller and a stationary protective cover and a cover member which surround the deflection roller at least in some of its regions to protect the deflection roller from a broken saw chain. The protective cover and the cover member are provided with through-openings which can be aligned with each other for passing therethrough a fastening element. The cover member has a radial wall and is displaceable along a path radially spaced from the axle of the deflection roller. The cover member can be fixedly secured to the protective cover in accordance with a predetermined pattern that corresponds to orientation of the deflectable saw chain.

The drawbacks of the solution set forth in the European Patent consists in that the cover member is arranged on the protective cover only in accordance with a predetermined pattern, and fixedly securing of the cover member on the protective cover is time-consuming and expensive as the cover member should be taken off at each change of its position.

Accordingly, an object of the present invention is a deflection device for a saw assembly, in particular, a rope saw assembly and which insures protection against the saw rope in case of a rope break and which can be economically produced.

SUMMARY OF THE INVENTION

This and other objects of the present invention, which will become apparent hereinafter, are achieved by providing a deflection device of the type discussed above and in which the cover member is pivotally arranged on the protective cover.

By pivotally arranging the cover member on the protective cover, it is insured that by pivoting the cover member about the pivot axis in accordance with the course of the saw rope or the rope deflection angle, the cover member can be oriented with respect to the stationary protective cover in a large angular region. If, e.g., the rope breaks during a sawing process, the cover member reduces or limits the whip action of the broken rope by covering an increased region of the deflection roller.

In addition, the cover member prevents, in particular when it has a wall section radially spaced from the pivot axis of the deflection roller, dirt clinging to the saw rope and water from accelerating outwardly at deflection of the saw rope. Advantageously, the protective cover likewise has a wall section spaced from the pivot axis or the roller axle. The two wall sections, when partially overlapping each other, cover a greater region of the deflection roller. It is further advantageous when the radial distance of the wall section of the cover member from the axle of the deflection roller is greater than the radial distance of the wall section of the protective cover from the deflection roller axle. Therefore, the cover member pivots away from the protective cover.

Advantageously, the cover member is pivotally supported on the axle of the deflection roller. This provides for a simple mounting of the cover member with few separate parts.

Alternatively, the at least one cover member can be pivotally mounted on or fixedly secured to the protective cover with slotted link means. The slotted link means can include, e.g., an elongate hole and a guide pin that cooperates with the elongate hole, with the elongate hole being provided, e.g., in the cover member and the guide pin being provided on the protective cover. The elongate hole can also be provided in the protective cover, with the cooperating guide pin being provided on the cover member.

Advantageously, there is provided a fixing device for securing the cover member on the protective cover in a desired orientation. Thereby, the orientation of the cover member on the stationary protective cover cannot be inadvertently changed. Advantageously, the fixing device applies a locking force to the cover member and the protective cover in its tightened condition, with the deflection roller, however, being able to freely rotate about the its axle.

In a preferred embodiment, the fixing device includes a spring that is formed, e.g., as a plate spring and frictionally acts on the cover member. Advantageously, the fixing device is provided in the region of the roller axle, which enables mounting and securing of the cover member with few components.

Advantageously, a guide device is provided for guiding the cover member relative to the protective cover. For limiting the pivotal region of the cover member, the guide device has advantageously two stops between which the cover member can be secured to the protective cover in an arbitrary angular position. According to another embodiment, the fixing device or a further fixing device for the cover member can be formed as a component of the guide device, whereby, advantageously a suitable fixing element simultaneously forms a stop of the guide device.

Advantageously, the guide device includes an elongate hole and a stop extending in the elongate hole, with the hole ends, together with the stop, defining a maximal pivot region of the cover member. When the stop engages an end of the elongate hole, further pivotal movement in the same direction is prevented.

In a preferred embodiment, the elongate hole is provided in the cover member, and the stop is provided on the protective cover. Advantageously, the elongate hole has a constant width and extends along an arcuate, extending radially with respect to the axle of the deflection roller, longitudinal axis, so that a play between the stop and the elongate hole over the entire pivot region of the cover member changes only unsubstantially. The stop is formed, e.g., by an element projecting from the protective cover of the deflection roller, e.g., by a bolt or a cam.

Preferably, the free, adjacent to the saw rope, end of a wall section, which is spaced from the axle of the deflection roller, is rounded, so that to sharp edges exist in the region of the free end. Thereby, in case of a saw rope break, the saw rope that contacts the free end of the cover member would be damaged only slightly.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 3 a cross-sectional view along line III-III in FIG. 1;

FIG. 4 a side view of a second embodiment of a deflection device according to the present invention for a rope saw assembly; and FIG. 5 a side view of a third embodiment of a deflection device according to the present invention for a rope saw assembly.

DETAILED DESCRIPTION OF THE PREFERRED EMBODIMENTS

Figure 1:
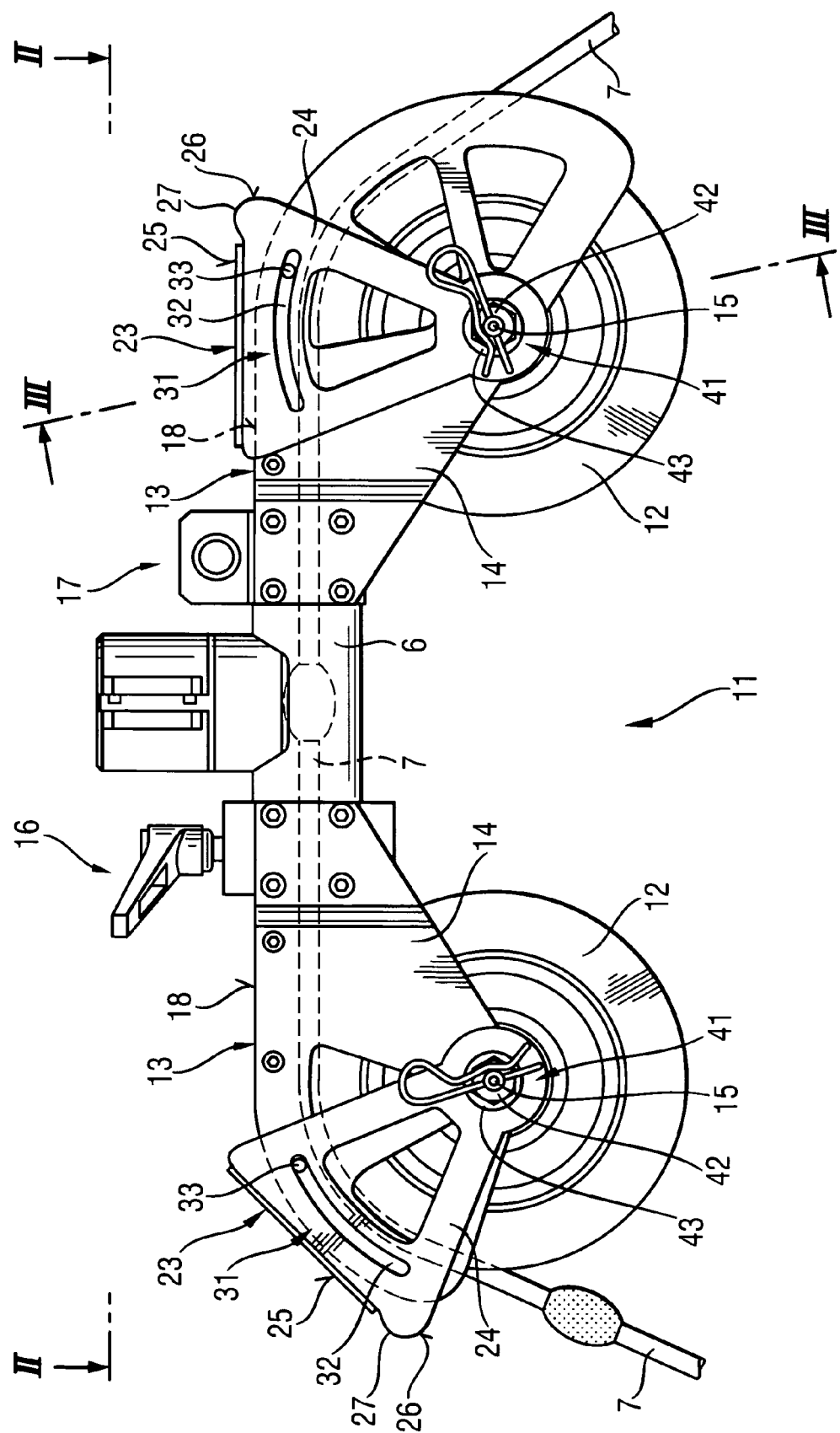
FIG. 1 a side view of a first embodiment of a deflection device according to the present invention for a rope saw assembly.
Figure 2:
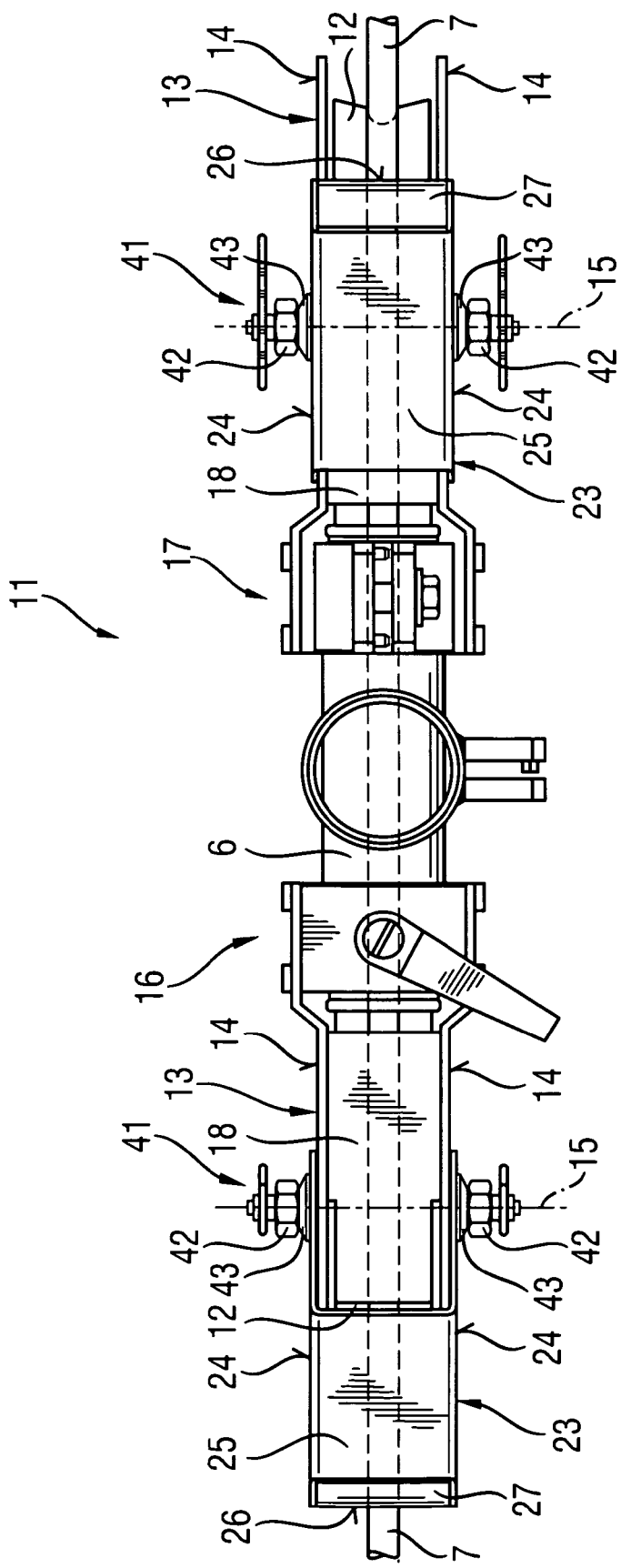
FIG. 2 a plan view of the deflection device shown in FIG. 1 viewed in a direction II-II in FIG. 1.

A deflection device 11 for a rope saw assembly, which is shown in FIGS. 1-3, has two deflection rollers 12 which are secured on a support 6. Both rollers 12 are formed substantially identically, and each has a stationary protective cover 13 that surrounds a respective roller 12 in some regions. In some of its regions, the protective cover 13 has, when viewed in a direction perpendicular to an axle 15 of the roller 12, a U-shaped cross-section with a radial wall section 18 extending substantially parallel to the roller axle 15, and two legs 14 extending from the radial wall section 18 on opposite sides thereof. In the regions of free ends of the legs 14 of the protective cover 13, there is provided a through-opening for supporting the axle 15 of the roller 12. A securing device 16 or 17 releasably secures the protective cover 13 on the support 6.

Each of the deflection rollers 12 is further provided with a cover member 23. The cover member 23 is pivotally arranged on the protective cover 13 and has a wall section 25 radially spaced from the axle 15 of the deflection roller 12. The cover member 23 is pivotally supported on the roller axle 15. The cover member 23 likewise has, when viewed in a direction perpendicular to the roller axle 15, a U-shaped cross-section, with the legs 24 of the cover member 23 having, in the region of their free ends, a through-opening through which the roller axle 15 is extendable.

The radial distance of the wall section 25 of the cover member 23 from the roller axle 15 is greater than the radial distance of the wall section 18 of the protective cover 13 from the roller axle 15.

For guiding the cover member 23 and for limiting its pivotal region relative to the protective cover 13, there is provided a guide device 31 that includes an arcuate elongate opening 32 spaced from the roller axle 15 by a certain distance and formed in each of the leg 24 of the cover member 23, and a stop member 33 that projects from the leg 14 of the protective cover 13 and extends into the arcuate opening 32.

A fixing device 41 is provided on the roller axle 15 for fixedly securing the cover member 23 in a desired position with respect to the protective cover 13. The fixing device 41 includes a spring 43 that is formed as a plate spring and is arranged between an outer side of the cover member 23 and a nut 42 screwed on the axle 15 of the roller 12. Upon tightening of the fixing device 41, the spring 43 frictionally engages the cover member 23, securing it in the desired position. The fixing device 41 is so formed that the deflection roller 12 can fully rotate even in a tightened condition of the fixing device 41.

Each of the cover members 23 has, at the free end 26 of the wall section 25 adjacent to the saw rope 7, a rounding 27.

A deflection device 51 according to a second embodiment of the present invention, which is shown in FIG. 4, includes a deflection roller 52, a stationary protective cover 53, and a cover member 63 pivotally arranged on the protective cover 53, with both the protective cover 53 and the cover member 53 surrounding some regions of the deflection roller 52. The cover member 53 likewise has, when viewed in a direction perpendicular to the axis 55 of the deflection roller 52, a U-shaped cross-section, with an arcuate elongate opening 72 being provided in each of the legs 64. The arcuate openings 72 form slotted link elements which, together with a fastening element 73, e.g., a screw provided on the protective cover 53, form a link connection. The link connection provides for an easy pivotal movement of the cover member 63 relative to the stationary protective cover 53 or over the axle 55 of the deflection roller 52. Simultaneously, the link connection forms a securing device 81 for the cover member 53.

A deflection device 91 according to a third embodiment of the present invention, which is shown in FIG. 5, includes a deflection roller 92, a stationary protective cover 93, and two cover members 102 and 103 pivotally arranged on the protective cover 93, with the protective cover 93 and the cover members 102 and 103 surrounding some regions of the deflection roller 92. The radial distance of a wall section 105 of the cover member 103 from the axle 55 of the deflection roller 92 is greater than the radial distance of the wall section 108 of the cover member 102, and the radial distance of the wall section 108 from the axle 95 is greater than the radial distance 98 of the protective cover 93 from the roller axle 95. The cover members 102 and 103 are pulled together and are spreaded out in a fanlike manner.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A deflection device for a rope saw assembly, comprising a deflection roller (12; 92); a stationary protective cover (13; 93) surrounding at least some regions of the deflection roller (12; 92); and at least one cover member (23; 102, 103) pivotally arranged on the protective cover (13; 93) surrounding at least some regions of the deflection roller, and displaceable along a path radially spaced from an axle (15; 95) of the deflection roller (12; 92), wherein the at least one cover member (23, 102, 103) is pivotally supported on the axle (15; 95) of the deflection roller (12; 92).

2. A deflection device for a rope saw assembly, comprising a deflection roller (12; 52; 92); a stationary protective cover (13; 53; 93) surrounding at least some regions of the deflection roller (12; 52; 92); at least one cover member (23; 63; 102, 103) pivotally arranged on the protective cover (13; 53;

93) surrounding at least some regions of the deflection roller, and displaceable along a path radially spaced from an axle (15; 55; 95) of the deflection roller (12; 52; 92); and a fixing device (41; 81) for securing the cover member (23; 63) in a desired position relative to the protective cover (13; 53).

3. A deflection device according to claim 2, wherein the fixing device (41) comprises a spring (43).

4. A deflection device according to claim 1, further comprising guide means (31) for displacing the cover member (23) relative to the protective cover (13).

5. A deflection device according to claim 4, wherein the guide means (31) comprises an elongate opening (32), and a stop element (33) extending into the elongate opening (32).

6. A deflection device according to claim 5, wherein the elongate opening (32) is provided in the cover member (23), and the stop element (33) is provided on the protective cover (13).

7. A deflection device according to claim 1, wherein a wall section (25) of the cover member (23), which is radially spaced from the axle (15) of the deflection roller (12), is rounded at a free end (26) of the wall section (25) adjacent to the saw rope (7).

\* \* \* \* \*